United States Patent [19]

Johnson

[11] Patent Number: 4,560,262
[45] Date of Patent: Dec. 24, 1985

[54] FILM UNIT STORAGE AND DISPENSING APPARATUS

[75] Inventor: Bruce K. Johnson, Andover, Mass.

[73] Assignee: Polaroid Corporation, Cambridge, Mass.

[21] Appl. No.: 566,263

[22] Filed: Dec. 28, 1983

[51] Int. Cl.[4] .................. G03B 17/26; G03B 17/52
[52] U.S. Cl. ........................... 354/180; 354/86; 354/212; 354/276
[58] Field of Search ............... 354/84, 85, 86, 180, 354/212, 275, 276

[56] References Cited

U.S. PATENT DOCUMENTS

| | | | |
|---|---|---|---|
| 3,511,152 | 5/1970 | Erlichman | 95/13 |
| 3,525,192 | 8/1970 | Merkel et al. | 53/15 |
| 3,525,293 | 8/1970 | Harvey | 95/13 |
| 3,541,938 | 11/1970 | Harvey | 95/13 |
| 3,561,346 | 2/1971 | Stephenson | 98/119 |
| 3,653,308 | 4/1972 | Erlichman | 95/13 |
| 3,675,551 | 7/1972 | Land | 95/11 |
| 3,678,830 | 7/1972 | Erlichman | 195/13 |
| 3,760,701 | 9/1973 | Paglia | 95/11 |
| 3,820,136 | 6/1974 | Kennedy | 354/81 |
| 3,821,760 | 6/1974 | Kennedy et al. | 95/14 |
| 3,852,783 | 12/1974 | Kennedy et al. | 354/174 |
| 4,042,395 | 8/1977 | Tone | 96/76 |
| 4,047,192 | 9/1977 | Johnson et al. | 354/83 |
| 4,078,241 | 3/1978 | Paglia | 354/86 |
| 4,114,166 | 9/1978 | Driscoll et al. | 354/76 |
| 4,126,875 | 11/1978 | Wareham | 354/86 |
| 4,236,798 | 12/1980 | Sylvester | 354/181 |
| 4,318,601 | 3/1982 | Martin | 354/86 |

Primary Examiner—A. A. Mathews
Attorney, Agent, or Firm—Leslie J. Payne

[57] ABSTRACT

There is disclosed an apparatus for storing and dispensing a plurality of film units of the self-developing type. An opening is formed in a housing containing a stack of the units through which advancing means move to withdraw a bottommost film unit therefrom. The advancing means includes pick arms which are arranged so as to impart withdrawal forces to the marginal edges of the unit having a pod and fluid trap.

5 Claims, 3 Drawing Figures

FILM UNIT STORAGE AND DISPENSING APPARATUS

BACKGROUND OF THE INVENTION

This invention relates generally to an apparatus for extracting a film unit from a film magazine or pack. More particularly, it relates to an apparatus for extracting successive bottommost film units from an array of self-developing film units stacked in the film pack.

With the advent of instant photography, photographic apparatus of the self-developing type have been devised in which the exposure, processing and ejecting operations of self-developing type film are carried out within the same apparatus. Such apparatus and film are disclosed in several U.S. patents assigned in common herewith. Typically, this apparatus includes a camera body housing a film pack containing a stacked array of film units. The pack itself has a film exit slot located adjacent a pair of pressure-applying rollers. These rollers are also mounted adjacent a camera body exit slot through which a film unit is advanced from the pack after being exposed.

For advancing the film unit from the pack after exposure, there is provided a film pick mechanism. A wide variety of such mechanisms exist. Typically, these include a film pick unit which is advanced to engage a marginal edge of the film unit which is opposite to the rupturable pod of such unit. Picking advances the topmost film unit of the film pack through the film pack exit slot so that the rupturable pod is brought into engagement with the rollers, whereupon it is further advanced by them through the camera body exit slot. Simultaneously and progressively the rollers cause uniform spreading of the processing fluid in the film unit. Exemplary ones of these different kinds of picking mechanisms are disclosed in commonly-assigned U.S. Pat. Nos. 3,675,551; 3,678,830; 3,653,308; 3,561,346; 3,511,152; 3,760,701; 4,126,875; 4,047,192. Picking of the type disclosed is preferable for a number of reasons. One being that it simplifies the steps and mechanisms necessary to feed the film unit to the processing rollers. While the picking described in the foregoing patents involved picking of the topmost units, there are situations in which it is desirable to pick from the bottom of the stack. U.S. Pat. Nos. 3,525,293; 4,114,166; 4,318,601 are illustrative of cameras in which this occurs.

It is to be noted that all of the noted picking mechanisms employ a so-called rear picking type mechanism, that is one in which the film units are advanced in a direction and manner such that during film advancement the marginal edge containing the pod initially engages the rollers.

It has been determined that when removing the bottommost film unit, of the standard flexible self-developing type, from a stack of such units, the potential for mis-picking and double-picking is increased. Clearly, it is highly desirable to avoid such problems.

SUMMARY OF THE INVENTION

The present invention seeks to avoid the potential for these problems and thereby provide an effecient and reliable mechanism for transporting film units from a stack of such units.

In accordance with the present invention, provision is made for a film unit dispensing apparatus for use in dispensing individual film units of the self-developing type. Film units of this type have a rupturable pod of processing fluid extending adjacent a leading marginal edge thereof, and a processing fluid trap, which receives processing fluid from the ruptured pod adjacent an opposite or trailing marginal edge. The pod tends to stiffen the leading marginal edge.

In an illustrated embodiment there is provided a chamber configured for receiving a stack of film units in overlying relation to each other. An opening is located in the chamber in adjoining operative relation to one film unit of the stack. The opening extends along a first side margin of the film unit. Means are provided for advancing the film unit from the stack. The advancing means includes a pick arrangement configured to engage a second side margin of the film unit opposite the first side margin and advance the film unit through the opening. The pick arrangement bears on the second side margin in at least adjoining relation to one end of the pod to utilize the stiffness of the unit provided thereat for advancement of the one film unit from the chamber. The chamber and the film unit stack are configured and arranged for successively placing another film unit in a location operatively adjoining the opening following advancement of each film unit from the chamber.

In an illustrated embodiment the means for advancing the film units from the chamber opening includes at least a pair of spaced-apart pick arms being movable through the opening between a first position, inside the chamber to a second position outside the chamber. Whenever the pick arms are at the first position they cooperate with the bottommost stacked film unit, and whenever the pick arms are transported to the second position the bottommost film unit is carried therewith to the exterior of the chamber. The pick arms are spaced-apart by a predetermined distance so as to provide pulling forces acting on the bottom unit which is generally coincidental with respective ones of the relatively stiff marginal edges containing the pod and trap.

Among the objects of the inventions are, therefore, the provision of an improved apparatus for dispensing film units of the self-developing type which are relatively flexible; the provision of an improved film storing and dispensing apparatus which allows selective dispensing of stacked film units of the above type so that problems associated with mis-picking and double picking are minimized substantially; and, the provision of an improved film storing and dispensing apparatus of the foregoing types in which pick arms are used to withdraw the units along their opposed and relatively stiff marginal edges, defined by the pod and the trap.

Other objectives and further scope of applicability of the present invention will become apparent from the detailed description to follow when taken in conjunction with the accompanying drawings in which like parts are designated by like reference numerals.

DETAILED DESCRIPTION

Figure 1:
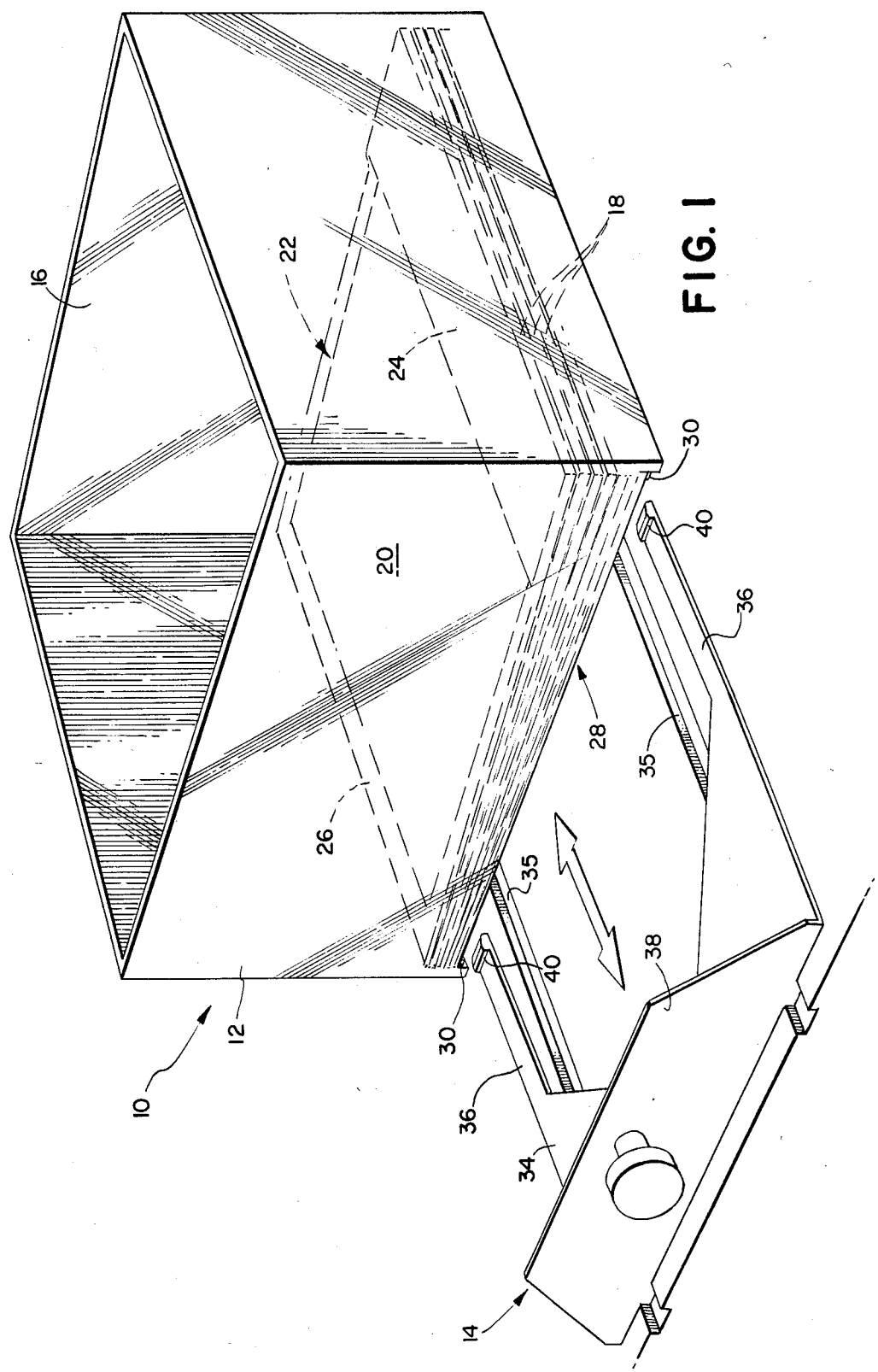
FIG. 1 is a perspective view of a film extracting apparatus made according to the present condition.
Figure 2:
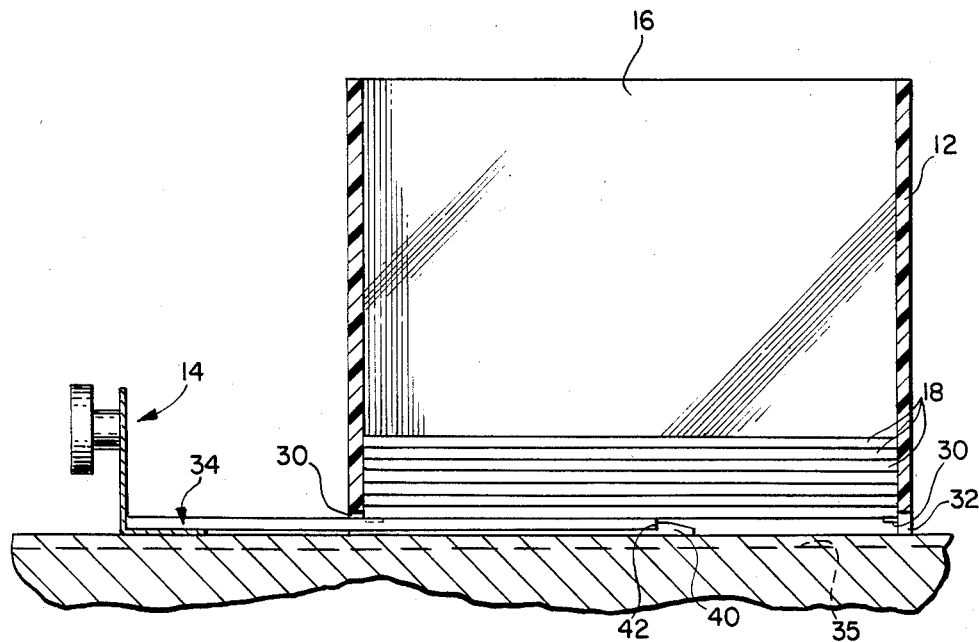
FIG 2 is a cross-sectional end view of the apparatus shown in FIG. 2.

Reference is made to FIGS. 1 and 2 for showing an improved film unit storing and dispensing apparatus 10 of the present invention. Included in the storing and dispensing apparatus 10 is a film pack or magazine housing 12 and a film unit extracting mechanism 14.

In this embodiment, the film pack housing 12 has a generally parallelpiped construction defining a light-tight chamber 16 configured to store an array of stacked unexposed film units 18 of the self-developing kind; such as of the type described in commonly assigned U.S. Pat. Nos. 3,543,662; 3,705,542; 3,748,984 and 3,779,770.

For purposes of understanding this invention each of the film units 18 has a generally integral rectangular format with a generally square image-forming area 20 actinic to incident ambient scene radiation. Bordering the image-forming area 20 is a frame 22. A rupturable container or pod 24 contains processing fluid and is located adjacent one side marginal edge of the unit. A fluid trap (not shown) is formed adjacent a side marginal edge 26 opposite the pod 24. The trap is for receiving processing fluid which has been spread over the image forming area 20 as the unit passes through pressure-applying rollers (not shown). Both the trap and the pod 24 extend longitudinally along generally parallel marginal side edges and are stiffer and heavier than the other portions of the unit, which are generally more flexible.

For dispensing purposes it will be appreciated that the film units 18 are stacked so that the pod and trap of each unit are placed over the respective pods and traps of the other stacked units. Accordingly, the weight of the stack of units tend to be concentrated along such marginal edges.

Referring back to the film pack housing 12, it includes a film-unit exit or withdrawal slot 28 formed adjacent the bottommost of the stacked film units 18. Such a slot 28 is sized and configured to allow ingress and egress of the film extracting mechanism 14 as well as, of course, removal of at least a single film unit 18. In this embodiment, the withdrawal slot 28 is oriented with respect to the stack so that both the pod and trap of each unit 18 emerge simultaneously from the housing 12. The advantages of such an orientation will be understood presently.

Formed in the bottom corners of the chamber 16 adjacent to slot 28 are shoulders 30 which support the stack of film units. Also the housing 12 is formed with a pick slot 32 along the side of the housing (FIG. 2) opposite the withdrawal slot 28. This is for purposes of faciliting movement of the extracting mechanism 14 to a position whereat it can cooperate with a side edge of the film unit 18.

Figure 3:
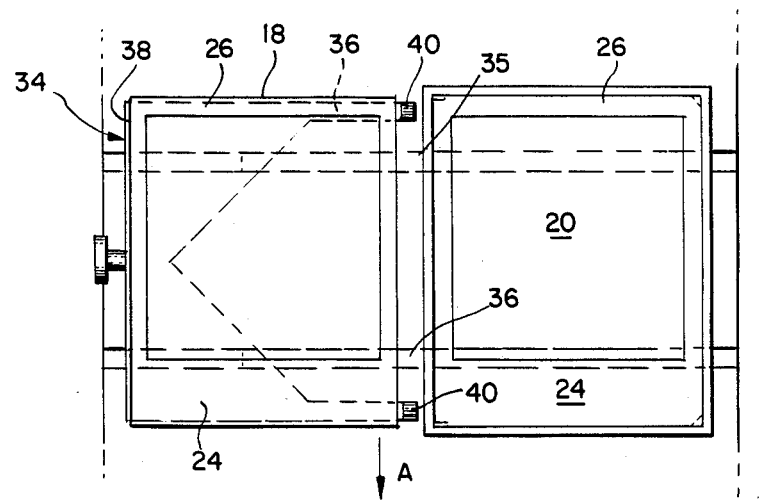
FIG. 3 is a plan view of the apparatus showing film unit extricated from a housing of stacked film units.

Now reference is made to the film extracting mechanism 14. It includes a film unit carrier plate 34. The carrier plate 34 is intended to translate between two positions, one inside the housing and the other outside the housing. As shown in FIG. 3, the carrier plate 34 is positioned at a photographic station outside the film pack housing 12 and carries thereon an unexposed film unit 18. In this position it is intended to expose the film unit 18 so carried by suitable means not shown and not forming part of the present invention. Once exposed, the unit 18 is transported by another mechanism (not shown) in the direction of arrow A so that the pod 24 can interact with the rollers for rupturing of the pod and subsequently spreading the fluid over the image forming area. Although it is not necessary to practice this invention, it will be noted that the carrier plate 34 moves in parallel grooves 35 formed in a carrier supporting surface for purposes of stability.

In this embodiment, the carrier plate 34 has a generally flat configuration with a pair of integrally formed and spaced-apart pick arms 36. The carrier plate 34 is, preferably, made of a flexible and resilient material for purposes which will become apparent. A reciprocatory driver (not shown) of some suitable type is connected to an upstanding flange 38 of the plate 34 and is responsible for translating the carrier plate 34 between the two noted positions. Each pick arm 36 is raised slightly from the remainder of the carrier plate 34. In practice, the pick arms 36 travel through the withdrawal slot 28 and under the bottommost stacked film unit such that the projections 40 are cooperable with a single side marginal edge 42 of the film unit 18, such as shown in FIG. 2.

It will be appreciated that the stack is so arranged that after bottommost unit is extracted the previous penultimate unit contacts the shoulder 30 and becomes the bottommost unit.

It is pointed out that the pick arms 36 are spaced apart so that they pull each film unit 18 with a force acting along the longitudinal extent of the marginal edges containing the pod and trap; respectively. It has been determined that the pick arms 36 should act beneath the weighted portions of the stacked film units. In doing this, there is less of a possibility of having a film unit 18 ride-off the pick arms 36 as the latter are advanced. This is because of the weight of the pods and traps bearing down on the bottommost pod and trap is sufficient to keep the unit 18 against the pick arms 36 during withdrawal. If the pick arms 36 acted upon the film unit such that they were pulling along portions of the film unit which were not as stiff or as heavily weighted, for instance the image receiving area, then there is the possibility of mis-picking. Bottom units in a stack are normally not flat. This is a potential problem, for proper focusing during exposure. Advantageously, the foregoing construction permits the bottom unit to be withdrawn and maintained in a generally flat condition for focusing purposes during exposure.

It will be appreciated that conventional rearpicking motion in the direction of the trap to pod would encounter mis-picking difficulties because the pick arms would be beneath the relatively light and flexible image receiving areas of the units. In other words, the film unit 18 could more easily ride-off the pick arms projections 40 during the film extracting step. This is because of the relatively lighter weight bearing down on them. In this regard, the pick arms 36 are also resilient so as to more easily follow and stay with the bottommost film unit as the latter is extracted. Advantageously, the pick arms 36 when so positioned extract single film units in a manner which minimizes mispicking and doublepicking.

From the foregoing, it is believed the operation of the present invention is made clear. Certain changes may be made in the above described apparatus without departing from the scope of the invention herein involved. It is intended that all matter contained in the description or shown in the accompanying drawings shall be interpreted as illustrative and not in a limiting sense.

What is claimed is:

1. Apparatus for storing a plurality of film units of the self-developing type and for successively dispensing each of said units to a photographic station, said film units comprising a flexible unit having a rupturable pod of processing fluid extending adjacent a leading margin of the film unit for subsequent advancement of its contained processing fluid across said film unit from the area of said leading margin to a trailing margin, wherein said film unit includes a processing fluid trap extending along said trailing margin of said film unit for capturing excess fluid, said trap stiffening said trailing margin, said pod stiffening said leading margin of said film unit, said apparatus comprising:

a housing configured for receiving a stack of film units in overlying relation to each other;

an opening located in said housing in adjoining operative relation to one film unit of said stack, said opening extending along a first side margin of said film unit;

means for advancing said one film unit from said stack, said means including a pick arrangement configured to engage a second side margin of said one film unit opposite said first side margin and advance said one film unit through said opening, said pick arrangement including at least a pair of spaced-apart pick arms being movable between a first position to a second position, wherein when said pick arms are at said first position they cooperate with the bottom stacked film unit, and wherein when said pick arms are transported to said second position the bottom film unit is carried therewith outside said housing; and, said pick arms being spaced apart by a predetermined distance so that each imparts a force acting on said bottom unit, which is generally coincidental with respective ones of said pod and said trap, when said arms move from said first position to said second position; and said housing and film unit stack being configured and arranged for successively placing another film unit in a location operatively adjoining said opening following advancement of each film unit from said housing.

2. The apparatus of claim 1 wherein said opening is located in said housing adjoining the bottom film unit of said stack.

3. A film unit storing and dispensing apparatus for use in dispensing individual film units of the self-developing type wherein each of the units has a rupturable pod of processing fluid extending adjacent one marginal edge thereof and a processing fluid trap, which receives processing fluid from the ruptured pod adjacent an opposite marginal edge, comprising:

a housing having a chamber for receiving a plurality of film units which are stacked so that respective pods and traps of each unit are in overlying position with pods and traps of other stacked units, and means for defining an access opening adjacent the bottom unit of the stacked film units for allowing withdrawal from said housing of at least successive single units therethrough, whereby both the pod and the trap can simultaneously emerge from said opening; and means for extracting individual film units from housing opening, said extracting means including at least a pair of spaced-apart pick arms being movable through said opening between a first position, inside said housing, to a second position outside said housing, wherein when said pick arms are at said first position they cooperate with the bottom stacked film unit, and wherein when said pick arms are transported to said second position the bottom film unit is carried therewith; and, said pick arms being spaced apart by a predetermined distance so that each imparts a force acting on said bottom unit, which is generally coincidental with respective ones of said pod and said trap, when said arms move from said first position to said second position.

4. The apparatus of claim 3 wherein each of said pick arms is comprised of a flexible and resilient material so as to facilitate movement of said pick arms under the bottom film unit in the stack when said arms move from said second position back to said first position.

5. The apparatus of claim 4 wherein each of said pick arms includes a film engaging projection formed integral therewith and adjacent a distal end thereof, said projections being sized and configured to engage a single common edge of the bottom unit such that said projections cause said unit to be carried by said arms to the outside of said housing when said arms move from said first to second position.

* * * * *